United States Patent
Nonaka et al.

(10) Patent No.: US 7,909,917 B2
(45) Date of Patent: Mar. 22, 2011

(54) POROUS STRUCTURE WITH SEED CRYSTAL-CONTAINING LAYER FOR MANUFACTURING ZEOLITE MEMBRANE, ZEOLITE MEMBRANE, AND METHOD FOR MANUFACTURING ZEOLITE MEMBRANE

(75) Inventors: Hisayoshi Nonaka, Nagoya (JP); Kunio Nakayama, Okazaki (JP); Kenji Yajima, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 513 days.

(21) Appl. No.: 11/893,530

(22) Filed: Aug. 16, 2007

(65) Prior Publication Data
US 2008/0047432 A1 Feb. 28, 2008

(30) Foreign Application Priority Data

Aug. 22, 2006 (JP) .................................. 2006-225207
Aug. 1, 2007 (JP) .................................. 2007-201325

(51) Int. Cl.
*B01D 53/22* (2006.01)
*B01D 71/02* (2006.01)

(52) U.S. Cl. ............... 96/11; 96/8; 96/10; 95/45; 95/51; 95/54; 55/523; 55/DIG. 5; 210/640; 210/490; 210/506; 501/80; 502/4

(58) Field of Classification Search ................ 96/4, 8, 96/10, 11; 95/45, 51, 54; 55/523, DIG. 5; 210/640, 651, 490, 500.23, 506; 501/80; 502/4, 60, 439

See application file for complete search history.

(56) References Cited

U.S. PATENT DOCUMENTS

| | | | |
|---|---|---|---|
| 5,413,975 A | 5/1995 | Mueller et al. | |
| 5,605,631 A | 2/1997 | Barri et al. | |
| 5,716,527 A * | 2/1998 | Deckman et al. | 96/11 |
| 5,871,650 A * | 2/1999 | Lai et al. | 96/11 |
| 5,968,366 A * | 10/1999 | Deckman et al. | 95/45 |
| 6,090,289 A * | 7/2000 | Verduijn et al. | 96/11 |
| 6,503,294 B2 * | 1/2003 | Yoshikawa et al. | 95/45 |
| 6,953,493 B2 | 10/2005 | Nakayama et al. | |

(Continued)

FOREIGN PATENT DOCUMENTS

EP   0 511 739   11/1992

(Continued)

OTHER PUBLICATIONS

W.M. Meier, et al., "*Atlas of Zeolite Structure Types*," Elsevier (1996).

*Primary Examiner* — Jason M Greene
(74) *Attorney, Agent, or Firm* — Burr & Brown (57) ABSTRACT

A porous substrate with a seed crystal-containing layer for manufacturing a zeolite membrane includes: a ceramic porous substrate, and a seed crystal-containing layer containing a zeolite powder to function as a seed crystal for forming a zeolite membrane and a ceramic powder and being loaded on a surface of the ceramic porous substrate and fired to fix the seed crystal-containing layer on the porous substrate. The porous substrate with a seed crystal-containing layer used for manufacturing a zeolite membrane inhibits a defect such as a crack from being generated in the zeolite layer upon manufacture or use by manufacturing a zeolite membrane by the use of the substrate which then can be subjected to air-spraying, washing, and processing for the purpose of removing a foreign substance, etc., prior to hydrothermal synthesis.

8 Claims, 5 Drawing Sheets

| U.S. PATENT DOCUMENTS | | | |
|---|---|---|---|
| 7,014,680 B2 | 3/2006 | Nakayama et al. | |
| 7,510,598 B2 * | 3/2009 | Suzuki et al. | 96/11 |
| 2004/0173094 A1 * | 9/2004 | Nakayama et al. | 95/45 |
| 2006/0144239 A1 * | 7/2006 | Suzuki et al. | 96/108 |
| 2007/0280878 A1 * | 12/2007 | Yeung et al. | 423/702 |

| FOREIGN PATENT DOCUMENTS | | |
|---|---|---|
| EP | 0 570 842 | 11/1993 |
| EP | 1 661 616 | 5/2006 |
| JP | 2003-159518 A1 | 6/2003 |
| WO | 00/38910 | 7/2000 |

* cited by examiner

POROUS STRUCTURE WITH SEED CRYSTAL-CONTAINING LAYER FOR MANUFACTURING ZEOLITE MEMBRANE, ZEOLITE MEMBRANE, AND METHOD FOR MANUFACTURING ZEOLITE MEMBRANE

BACKGROUND OF THE INVENTION AND RELATED ART STATEMENT

The present invention relates to a ceramic porous substrate with a seed crystal-containing layer used for manufacturing a zeolite membrane, a zeolite membrane obtained by the use of the substrate, and a method for manufacturing the zeolite membrane.

Zeolite is a kind of silicate having pores in the crystal structure, and many kinds (type) having different crystal structures (pore structures) such as LTA, MFI, MOR, AFI, FER, FAU, and DDR are present. Each of these kinds of zeolite has its own adsorbability, catalyst performance, ion exchangeability, and the like, based on a crystal structure and a chemical composition of each kind, and these zeolites are used in various kinds of fields such as adsorbing materials, catalysts (catalyst carriers), and ion exchangers.

In particular, in recent years, gas separation has been conducted by the use of pores peculiar to zeolite. For example, a zeolite membrane of a DDR (Deca-Dodecasil 3R) type zeolite (see, e.g., W. M. Meier, D. H. Olson, Ch. Baerlocher, Atlas of Zeolite Structure Types, Elsevier (1996)) containing silica ($SiO_2$) as the main component, containing oxygen 8-membered ring, and having relatively small pores (pore size of 4.4×3.6 angstrom) among various kinds of zeolite in the crystal structure is used as a separation membrane to allow only carbon dioxide ($CO_2$) gas or the like to selectively permeate the membrane to separate the carbon dioxide ($CO_2$) gas or the like from the mixed gas.

Upon gas separation as described above, there is generally used a porous substrate of ceramic or the like with a zeolite membrane formed on a surface thereof from the viewpoint of improving mechanical strength while securing a gas permeation amount.

Such a zeolite membrane can be obtained, for example, by allowing a zeolite powder for a seed crystal to adhere to a surface of a porous substrate of ceramic or the like and subjecting the substrate with a zeolite adhering thereto to a heat treatment (hydrothermal synthesis of zeolite) in a state that the substrate is immersed in a raw material solution for synthesizing a zeolite containing a structure-determining agent, water, a silicon source, and the like, to grow a zeolite powder (seed crystal) to form a zeolite membrane, followed by a thermal treatment in an oxygen-containing atmosphere (see, e.g., JP-A-2003-159518).

However, by the aforementioned method, a defect such as a crack is sometimes generated in the zeolite membrane formed on a surface of the porous substrate upon the thermal treatment (conducted in order to burn out the structure-determining agent remaining in the synthesized zeolite) or upon its use for gas separation or the like even if a defect is not generated while manufacturing the zeolite membrane. Such a defect is not preferable in that the gas-separation function in the gas separator is remarkably deteriorated.

In addition, since the zeolite powder (seed crystal) allowed to adhere to a surface of the porous substrate easily falls off from the porous substrate, any air-spraying or washing for the purpose of removing a foreign substance is impossible prior to hydrothermal synthesis of zeolite, and the processing of the substrate after adhesion of zeolite also becomes impossible.

Further, there is a problem of having difficulty in handling because it is necessary to carefully handle the substrate in case the zeolite powder falls from the surface of the substrate upon immersing the substrate, with the zeolite powder adhering thereto, in a raw material solution for synthesizing a zeolite.

SUMMARY OF THE INVENTION

The present invention has been made in view of such problems of the prior art and aims to provide a porous substrate with a seed crystal-containing layer used for manufacturing a zeolite membrane, that is capable of inhibiting a defect such as a crack from being generated in the zeolite layer upon manufacture or use by manufacturing a zeolite membrane by the use of the substrate, and that is capable of being subjected to air-spraying, washing, and processing for the purpose of removing a foreign substance, etc., prior to hydrothermal synthesis; a zeolite membrane obtained by the use of the substrate; and a method for manufacturing the zeolite membrane.

In order to achieve the above aim, according to the present invention, there is provided the following porous substrate with a seed crystal-containing layer, zeolite membrane, and method for manufacturing a zeolite membrane.

According to a first aspect of the present invention, a ceramic porous substrate with a seed crystal-containing layer for manufacturing a zeolite membrane preferably includes:

a seed crystal-containing layer containing a zeolite powder and a ceramic powder, wherein the seed crystal-containing layer containing a powder of zeolite as a seed crystal for forming a zeolite membrane and a ceramic powder are loaded on a surface of the ceramic porous substrate, and wherein the seed-crystal containing layer is fixed on the ceramic porous substrate by firing the substrate on which the seed crystal-containing layer is loaded.

According to a second aspect of the present invention, a ceramic porous substrate with a seed crystal-containing layer according to the first aspect is provided, wherein the zeolite powder is a DDR (Deca-Dodecasil 3R) type zeolite powder.

According to a third aspect of the present invention, a ceramic porous substrate with a seed crystal-containing layer according to the first or second aspects is provided, wherein a volume ratio of the zeolite powder to the ceramic powder (volume of the zeolite powder:volume of the ceramic powder) in the seed crystal-containing layer is 80:20 to 10:90.

According to a fourth aspect of the present invention, a zeolite membrane formed on a surface of the ceramic porous substrate by growing the zeolite powder contained in the seed crystal-containing layer of the ceramic porous substrate with a seed crystal-containing layer according to any one of the first to third aspects is provided by hydrothermal synthesis.

According to a fifth aspect of the present invention, a method for manufacturing a zeolite membrane preferably includes the steps of:

loading a seed crystal-containing layer containing a zeolite powder as a seed crystal for forming a zeolite membrane and a ceramic powder on a surface of the ceramic porous substrate, firing the seed crystal-containing layer to obtain a ceramic porous substrate with the seed crystal-containing layer fixed thereon, and growing the zeolite powder contained in the seed crystal-containing layer of the substrate by hydrothermal synthesis to form a zeolite membrane on a surface of the ceramic porous substrate.

Since, in a porous substrate with a seed crystal-containing layer of the present invention, a seed crystal-containing layer is fixed to the porous substrate by firing after loading the seed crystal-containing layer on a surface of the porous substrate, the seed crystal does not easily fall off from the porous substrate. Therefore, in the case of manufacturing a zeolite membrane by the use of the porous substrate with a seed crystal-containing layer, it is possible to subject the substrate to air-spraying or washing for the purpose of removing a foreign substance, etc., prior to growing the seed crystal by hydrothermal synthesis, and the processing of the substrate is also made possible. In addition, when the porous substrate with a seed crystal-containing layer is immersed in a raw material solution for synthesizing a zeolite for hydrothermal synthesis, it can be handled easily because the zeolite powder does not fall off from the surface of the substrate even if the substrate is not handled carefully. Further, a difference in thermal expansion coefficient between the porous substrate and the zeolite membrane is relaxed by the ceramic contained in the seed crystal-containing layer to inhibit a defect such as a crack from generating in the zeolite layer upon its manufacture or use. Furthermore, in the ceramic particle, necking is caused between particles by firing, thereby obtaining a high membrane strength. Since a zeolite membrane of the present invention is manufactured by the use of the porous substrate with a seed crystal-containing layer, various kinds of effects as described above are obtained upon its manufacture and use. According to a method for manufacturing a zeolite membrane of the present invention, a zeolite membrane having various kinds of effects as described above can be simply manufactured.

DESCRIPTION OF REFERENCE NUMERALS

1: porous substrate, 2: container, 3: slurry for loading a seed crystal-containing layer, 4: pipe, 5: vacuum pump, 6: rubber plug, 7: rubber plug, 10: chamber for a gas permeation test, 11: O ring, 12: mixed gas introduction port, 13: sweep gas introduction port, 14: permeated gas collection port

DETAILED DESCRIPTION OF THE INVENTION

A typical embodiment of the present invention will hereinbelow be described specifically. However, the present invention is by no means limited to the following embodiment, and it should be understood that modification, improvement, or the like, may suitably be added to the design on the basis of knowledge of those skilled in the art within a range of not deviating from the gist of the present invention.

A porous substrate with a seed crystal-containing layer of the present invention is manufactured by loading a seed crystal-containing layer containing a zeolite powder to function as a seed crystal for forming a zeolite membrane and a ceramic powder, followed by firing to fix the seed crystal-containing layer on the porous substrate. The porous substrate with a seed crystal-containing layer is an intermediate body in manufacturing a zeolite membrane, and by growing the zeolite powder contained in the seed crystal-containing layer of the porous substrate with the seed crystal-containing layer by hydrothermal synthesis or the like to form a zeolite membrane on a surface of the porous substrate.

The "porous substrate" used in the present invention is a member formed of ceramic and having a large number of pores three-dimensionally connected with one another. After the zeolite membrane is formed on a surface of the porous substrate, the porous substrate functions as a support for the membrane and has gas permeability which allows gas to permeate the substrate.

It is preferable that the porous substrate has a mean pore diameter of 0.03 to 10 μm. When it is below 0.03 μm, resistance (pressure loss) upon gas permeation is large, and it is not preferable that gas permeability (treatment performance of the gas separator) may be lowered when a formed zeolite membrane is used as a gas separation membrane. When the mean pore diameter is above 10 μm, it is also not preferable that the mechanical strength required as a support for a zeolite membrane may be remarkably deteriorated.

Incidentally, a "mean pore diameter" in the present specification means a pore diameter measured by mercury porosimetry and calculated from pressure when an accumulated volume of mercury put in the porous substrate under pressure is 50% of the whole pore capacity of the porous substrate.

The porous substrate preferably has a porosity of 20 to 60%, more preferably 25 to 40%. When it is below 20%, it is not preferable, since the resistance (pressure loss) rises and the gas permeability (treatment performance of the gas separator) may be lowered when a formed zeolite membrane is used as a gas separation membrane. When it is above 60%, it is also not preferable since the mechanical strength required as a support for a zeolite membrane may be remarkably decreased. Incidentally, the "porosity" in the present specification means a porosity measured with a mercury porosimeter.

As the ceramic constituting the porous substrate, conventionally known ceramics such as alumina, zirconia ($ZrO_2$), and mullite ($3Al_2O_3 \cdot 2SiO_2$) may be used. In the present invention, an alumina porous substrate is particularly and suitably used since it can easily be obtained on the market with uniform fine particles and as such, a high purity can be obtained by a simple method such as alkoxide hydrolysis.

In addition, in the present invention, there is no particular limitation on a shape of the porous substrate, and various kinds of shapes such as a plate-like shape, a hollow cylindrical shape (pipe shape), a honeycomb shape, and a monolith shape (lotus root shape) may be employed.

The seed crystal-containing layer loaded on a surface of the porous substrate contains a zeolite powder to function as a seed crystal for forming a zeolite membrane and a ceramic powder.

The present inventors investigated the cause of the defect generated in the zeolite membrane formed on a surface of the porous substrate. As a result, it was found out that a defect such as a crack is generated when the difference in thermal expansion coefficient between the porous substrate and the zeolite membrane is large. That is, when a zeolite membrane supported on a surface of the porous substrate is put under high-temperature conditions (e,g, upon thermal treatment, upon gas separation, etc.), thermal stress acts on the zeolite membrane, which is relatively brittle in comparison to the porous substrate, and further, since the thermal expansion behavior is different between the porous substrate and the zeolite membrane, a defect such as a crack will be generated.

Therefore, in the present invention, besides a zeolite powder to function as a seed crystal for forming a zeolite membrane, a ceramic powder is contained in the seed crystal-containing layer to decrease the difference in thermal expansion coefficient between the porous substrate and the zeolite upon, during and after the membrane-forming, thereby inhibiting a defect such as a crack from being generated. In addition, necking is caused between ceramic particles in mutual contact in the seed crystal-containing layer in the firing step described below, thereby improving the strength of a zeolite membrane upon and after the membrane-forming as well as the fixation strength of the seed crystal-containing layer to a surface of the porous substrate.

In the ceramic powder, there is no limitation on a shape of a ceramic particle as long as it can easily be sintered at a temperature where a zeolite seed crystal is not decomposed, that is, in a low temperature range of about 400 to 1000° C. As a ceramic powder meeting such a condition, a titania powder is suitable. A firing temperature when a titania powder is used is preferably about 700 to 1000° C. Additionally, a ceramic powder of alumina, zirconia, or silica can be used, which also can be sintered at low temperature, or a ceramic powder of silica, alumina, or the like, manufactured by a sol-gel method because they can easily be sintered within a low temperature range of about 400 to 1000° C.

Examples of the zeolite powder contained in a seed crystal-containing layer includes conventionally known zeolite powders such as LTA, MFI, MOR, AFI, FER, FAU, and DDR. The zeolite powder may be selected from these various kinds of zeolite powders having different crystal structure (pore structure) according to use or the like of the zeolite membrane. In particular, since a DDR type zeolite has a characteristic of selectively allowing gas such as carbon dioxide ($CO_2$) to permeate, it can particularly suitably be used in that it can be applied to industrially useful uses of removing carbon dioxide among various kinds of zeolites.

A volume ratio of the zeolite powder to the ceramic powder in the seed crystal-containing layer (volume of zeolite powder:volume of ceramic powder) is preferably 80:20 to 10:90, more preferably 70:30 to 30:70, furthermore preferably 60:40 to 40:60 in consideration of a balance between an amount of seed crystal (zeolite powder) required to form a zeolite membrane and an effect of decreasing thermal expansion, improving membrane strength, and the like, by the ceramic powder.

The seed crystal-containing layer is loaded on a surface of the porous substrate. The "surface of the porous substrate" is different depending on a shape of the porous substrate and that means it has a front surface or a back surface if it has a plate-like shape. In a shape having an internal space (through-hole, etc.) such as a hollow cylindrical shape (pipe shape), a honeycomb shape, and a monolith shape (lotus root shape) the surface of a portion dividing the internal space of the porous substrate is also included besides the outer peripheral face of the porous substrate. In a porous substrate with a seed crystal-containing layer of the present invention, the seed crystal-containing layer may be disposed on at least one surface among these "surfaces of the porous substrate".

There is no particular limitation on a method for loading a seed crystal-containing layer on a surface of the porous substrate, and a conventionally known loading method such as dipping or filtration membrane-forming may be employed. Filtration membrane-forming is the most preferable method.

In the case of using a zeolite membrane for use of allowing fluid to permeate the membrane such as a gas separation membrane, the porous substrate functioning as a support for a zeolite membrane is sometimes formed to have a layered structure to make the mean pore diameter smaller from the layer constituting one surface of the porous substrate toward the layer constituting the other surface for the purpose of enhancing fluid permeability.

For example, in the case of forming the porous substrate to have a layered structure having three layers of a base layer, an intermediate layer, and a surface layer, a raw material containing ceramic particles (framework particles) having a predetermined mean particle diameter is formed in a desired shape such as a plate-like shape, a pipe shape, or the like, followed by firing to obtain a base layer. Next, by suction-filtrating slurry containing ceramic particles having a mean particle diameter smaller than that of the ceramic particles constituting the base layer with the base layer to deposit the ceramic particles in the slurry in layers on a surface of the base layer, followed by firing, the intermediate layer is obtained. Next, by suction-filtrating slurry containing ceramic particles having a mean particle diameter smaller than that of the ceramic particles constituting the intermediate layer with the layered body of the base layer and the intermediate layer to deposit the ceramic particles in the slurry in layers on a surface of the intermediate layer, followed by firing, the surface layer is obtained.

In the case of loading a seed crystal-containing layer on a surface of the porous substrate by filtration membrane-forming, the loading process is basically the same as the process for forming the intermediate layer and the surface layer. That is, by suction-filtrating slurry containing a zeolite powder and a ceramic powder with the layered body of the base layer, the intermediate layer, and the surface layer to deposit the zeolite powder and the ceramic powder in the slurry on a surface of the surface layer, followed by firing, the seed crystal-containing layer is obtained. Thus, by loading the seed crystal-containing layer on a surface of the porous substrate of the layered structure by filtration membrane-forming, loading of a seed crystal-containing layer can be carried out continuously after manufacture of the porous substrate in the same process as the formation of the intermediate layer and the surface layer. Therefore, the loading can be carried out effectively, and the productivity is improved. In addition, in the case of employing a filtration membrane-forming method, a zeolite powder to function as a seed crystal can be loaded on a surface of the porous substrate with high density in comparison with a dipping method. Therefore, a zeolite membrane can be formed with the minimum thickness, which enables the flow rate of fluid permeating the membrane to increase.

A seed crystal-containing layer in the present invention is fixed on a surface of a porous substrate by firing after it is loaded on a surface of the porous substrate. In manufacturing a conventional zeolite membrane, the zeolite powder is allowed to adhere to a surface of the porous substrate as the seed crystal and is subjected to a membrane-forming step such as hydrothermal synthesis or the like without being fired. Therefore, the zeolite powder in a step before membrane-forming is not firmly fixed on the surface of the porous substrate and is in a state of being easily detached. Therefore, even if adhesion or the like of a foreign substance other than the zeolite powder is recognized, air-spraying, or washing is impossible to remove the foreign substance without damage. Also, processing of the porous substrate after adhesion of the zeolite is impossible.

In a porous substrate with a seed crystal-containing layer of the present invention, since the seed crystal-containing layer is firmly fixed to a surface of the porous substrate by firing after loading of the seed crystal-containing layer, the seed crystal is fixed and will not fall off from the surface of the porous substrate. Therefore, in the case of manufacturing a zeolite membrane by the use of the porous substrate with a seed crystal-containing layer, air-spraying to the substrate or washing the substrate can be conducted for the purpose of removing a foreign substance prior to growing the seed crystal by hydrothermal synthesis or the like, and the processing of the substrate is also possible. In addition, upon immersing the porous substrate with a seed crystal-containing layer in a raw material solution for synthesizing a zeolite, the substrate can be handled easily because the zeolite powder does not fall off from the substrate even if the substrate is not handled very carefully. Further, as described above, necking is caused between ceramic particles that are in mutual contact in the seed crystal-containing layer by firing, thereby improving strength of a zeolite membrane upon and after membrane-forming as well as fixation strength of the seed crystal-containing layer to a surface of the porous substrate.

The firing is preferably conducted at temperature where the seed crystal is not decomposed and where necking is caused between ceramic particles as described above. For example, in the case of using titania particles as the ceramic particles, a temperature of about 700 to 1000° C. is suitable.

A zeolite membrane of the present invention is formed on a surface of the porous substrate by growing a zeolite powder contained in the seed crystal-containing layer of the porous substrate with the seed crystal-containing layer by hydrothermal synthesis.

The hydrothermal synthesis of the zeolite is conducted by a heat treatment in a state that the porous substrate with a seed crystal-containing layer is immersed in a raw material solution for synthesizing a zeolite containing at least a structure-determining agent, water, and a silicon source.

A "structure-determining agent" in the present specification means a substance which functions as a template for forming a crystal structure of various kinds of zeolites. For example, in the case of forming a zeolite membrane containing a DDR type zeolite, 1-adamantanamine is used as a structure-determining agent. In addition, water functions as a solvent upon synthesis (hydrothermal synthesis) of zeolite.

The silicon source is a substance functioning as a raw material for zeolite, and silica sol is generally employed suitably. Though a silica sol on the market is suitably used, the silica sol may be prepared by dissolving fine particle silica in water or by hydrolyzing alkoxysilane.

The raw material solution for synthesizing a zeolite may contain a substance other than a structure-determining agent, water, and a silicon source. For example, by allowing the solution to contain an aluminum source and a cation source, it is possible to manufacture a low silica type zeolite which contains aluminum and metal cation in its crystal structure and is different from an all silica type zeolite in adsorbability and catalyst performance. There can suitably be used aluminum sulfate, sodium aluminate, metal aluminum, or the like, as the aluminum source and an alkali metal salt of sodium hydroxide, sodium aluminate, or the like, as the cation source.

Since a composition of the raw material solution for synthesizing a zeolite is different depending on a kind of a zeolite to be synthesized, the composition of the solution is adjusted according to a conventionally known method for synthesizing various kinds of zeolites. Hereinbelow, by the example of the case that a zeolite to be synthesized is a DDR type zeolite, a suitable solution composition will be described.

Since 1-adamantanamine as a structure-determining agent is a substance to function as a template for forming a crystal structure of a DDR type zeolite, a molar ratio of 1-adamantanamine to silica, which is a silicon source functioning as a raw material for a DDR type zeolite, is very important. The molar ratio of 1-adamantanamine to silica is preferably 0.002 to 0.5, more preferably 0.002 to 0.03. When the molar ratio of 1-adamantanamine to silica is below the range of 0.002 to 0.5, 1-adamantanamine is insufficient, and it may be difficult to form a DDR type zeolite. When the molar ratio of 1-adamantanamine to silica is above this range, it means that expensive 1-adamantanamine is used more than necessary, which is not preferable from the viewpoint of production costs.

Incidentally, since 1-adamantanamine is hardly-soluble to water functioning as a solvent of hydrothermal synthesis, it is preferable that 1-adamantanamine is dissolved in ethylenediamine and then subjected to preparation of a raw material solution for synthesizing a zeolite. By preparing a raw material solution in a uniform condition by completely dissolving 1-adamantanamine in ethylenediamine, it is possible to form a DDR type zeolite having a uniform crystal size.

A molar ratio of ethylenediamine to 1-adamantanamine is preferably 4 to 35, more preferably 8 to 24, particularly preferably 10 to 16. When the molar ratio of ethylenediamine to 1-adamantanamine is below the range of 4 to 35, ethylenediamine is insufficient, and it may be difficult to completely dissolve the 1-adamantanamine. On the other hand, when the molar ratio is above this range, expensive ethylenediamine is used more than necessary, which again is not preferable from the viewpoint of production costs.

A molar ratio of water functioning as a solvent for hydrothermal synthesis to silica functioning as a raw material for a DDR type zeolite (When silica sol is used, it is converted from a concentration of a solid content.), that is, a water/silica molar ratio is preferably 10 to 500, more preferably 10 to 170, particularly preferably 10 to 90. When the water/silica molar ratio is below the range of 10 to 500, the silica content in the raw material solution is too high, and it is not preferable because a large amount of uncrystallized silica may remain. When the water/silica molar ratio is above this range, it is not preferable in that it may be difficult to form a DDR type zeolite because a silica content in the raw material solution is too low.

In addition, when the raw material solution is allowed to contain an aluminum source and a cation source, that is, when a low silica type DDR type zeolite is manufactured, it is preferable to adjust a composition of the raw material solution as follows.

A silica/alumina molar ratio in the case of converting aluminum in the aluminum source as an oxide is preferably 50 to 1000, more preferably 70 to 300, particularly preferably 90 to 200. When the silica/alumina molar ratio is below the range of 50 to 1000, it is not preferable because a percentage of amorphous silica may increase. On the other hand, when the silica/alumina molar ratio is above the range, it is not preferable in that properties of a low silica type DDR type zeolite may not be exhibited (no difference from an all silica type DDR type zeolite may be shown) due to remarkable decrease in the amount of aluminum and cation though a DDR type zeolite can be manufactured.

In addition, an alkali metal oxide/alumina molar ratio in the case of converting the alkali metal in the cation source as an oxide is preferably 1 to 25, more preferably 3 to 20, particularly preferably 6 to 15. When the alkali metal oxide/alumina molar ratio is below 1 to 25, it is not preferable because a DDR type zeolite having an aimed silica/alumina molar ratio cannot easily be obtained. On the other hand, when the alkali metal oxide/alumina molar ratio is above the range, this is also not preferable because a percentage of amorphous silica may increase.

A suitable composition of the solution in the case that a zeolite to be synthesized is a DDR type zeolite has been described. As a method for preparing a raw material solution in this case, there can suitably be employed a method for preparing a raw material solution, for example, by mixing a solution prepared by dissolving 1-adamantanamine to ethylenediamine, water as a solvent, and silica sol as a silicon source (and further aluminum sulfate as an aluminum source and sodium hydroxide as a cation source in the case of synthesizing a low silica type DDR type zeolite) together at the aforementioned ratio for dissolution.

Upon forming a zeolite membrane of the present invention, a zeolite membrane is formed on a surface of a porous substrate by growing a seed crystal by hydrothermal synthesis in a state that a porous substrate with a seed crystal-containing layer of the present invention is immersed in a raw material solution for synthesizing a zeolite, the solution being adjusted as described above.

Since conditions and a method for hydrothermal synthesis differ depending on the kind of the zeolite to be synthesized, the conditions and the method should be suitably selected according to a conventionally known method for synthesizing various kinds of zeolites. Suitable conditions and a suitable method will hereinbelow be described by using an example of the case that a zeolite to be synthesized is a DDR type zeolite.

It is preferable that hydrothermal synthesis is conducted at a temperature of 130 to 200° C. When the temperature is below 130° C., it is not preferable in that a DDR type zeolite may hardly be formed. On the other hand, when the temperature is above 200° C., it is also not preferable in that a DOH (Dodecacil 1H) type zeolite, which is not the objective, may be formed by phase transfer.

Incidentally, in a conventional method for manufacturing a DDR type zeolite, a mixed crystal of DDR and DOH may be formed if the raw material solution is not always stirred. However, when a method where 1-adamantanamine is dissolved in ethylenediamine is employed, the raw material solution should be kept in a uniform condition. Therefore, upon hydrothermal synthesis, a single phase crystal of DDR can still be formed even if the raw material solution is not always stirred.

A zeolite membrane formed by thus growing a seed crystal by hydrothermal synthesis is generally subjected to a thermal treatment in an oxygen-containing atmosphere and then used for various applications. By the thermal treatment, the structure-determining agent remaining in the zeolite membrane by synthesis can be burnt out.

Conditions for the thermal treatment differs depending on the kind of the structure-determining agent and the like. For example, in the case that the structure-determining agent is 1-adamantanamine (that is, in the case that the zeolite to be synthesized is a DDR type zeolite), 1-adamantanamine remaining in the synthesized zeolite can be evaporated or burnt off by heating at 650 to 900° C. for 1 to 10 hours in an ambient atmosphere.

Since a zeolite membrane of the present invention is manufactured by the use of a porous substrate with a seed crystal-containing layer, air-spraying to the substrate or washing the substrate is possible for the purpose of removing a foreign substance or the like, and processing the substrate is also possible prior to growing the seed crystal in the seed crystal-containing layer during manufacture. In addition, when the porous substrate with a seed crystal-containing layer is immersed in a raw material solution for synthesizing a zeolite, it can be handled easily because the zeolite powder hardly ever falls off from the surface of the substrate even if the substrate is not handled carefully. Further, a difference in thermal expansion coefficient between the porous substrate and the zeolite membrane is decreased by the ceramic contained in the seed crystal-containing layer which inhibits a defect such as a crack from generating in the zeolite layer upon its manufacture or use. Further more, necking is caused between particles that are in mutual contact by firing upon manufacturing a porous substrate with a seed crystal-containing layer, thereby obtaining a high fixing strength of the zeolite membrane to a surface of the porous substrate and a high strength of the zeolite membrane itself.

In a method for manufacturing a zeolite membrane of the present invention, a seed crystal-containing layer containing a zeolite powder to function as a seed crystal for forming a zeolite membrane and a ceramic powder is loaded on a surface of the ceramic porous substrate, the seed crystal-containing layer is fired to obtain a porous substrate with the seed crystal-containing layer fixed thereon, and the zeolite powder contained in the seed crystal-containing layer of the substrate is grown by hydrothermal synthesis to form a zeolite membrane on a surface of the porous substrate.

The present method may be a combined method of the method for manufacturing porous substrate with a seed crystal-containing layer and the method for manufacturing a zeolite membrane utilizing the substrate that is formed in series. The detailed conditions for those methods are described above. According to a method for manufacturing a zeolite membrane according to the present invention, a zeolite membrane having various meritorious advantages as described above can be simply manufactured.

EXAMPLE

The present invention will hereinbelow be described in more detail on the basis of examples. However, the present invention is by no means limited to the examples.

Manufacture of Seed Crystal

A DDR type zeolite powder was manufactured according to a method for manufacturing a DDR type zeolite described in M. J. den Exter, J. C. Jansen, H. van Bekkum, Studies in Surface Science and Catalysis vol. 84, Ed. by I Weitkamp et al., Elsevier (1994) 1159-1166. The DDR type zeolite powder was washed and subjected to course grinding by an agate mortar, followed by wet grinding for 16 hours in a ball mill with a zirconia ball having a diameter of 1 mm. By sieving the slurry after grinding with a 10 μm sieve to remove the ball and course particles, a seed crystal slurry was obtained. A part of the seed crystal slurry was extracted and subjected to weight analysis to confirm a concentration of a seed crystal in the slurry.

Preparation of Slurry for Loading Seed Crystal-Containing Layer

There were prepared a mixture of 150 g of a $TiO_2$ powder and 300 g of ion-exchanged water, and the mixture was stirred for 10 minutes with a propeller mixer to obtain $TiO_2$ slurry. The above DDR seed crystal slurry was added to $TiO_2$ slurry in such a manner that a mass ratio of the DDR type zeolite to the $TiO_2$ powder in the $TiO_2$ slurry is 5%, as they were mixed together. The slurry after being mixed was sieved with a 10 μm sieve to remove course particles, followed by stirring with a propeller mixer for ten minutes to obtain slurry for loading a seed crystal-containing layer.

Manufacture of Porous Substrate with a Seed Crystal-Containing Layer

Figure 1:
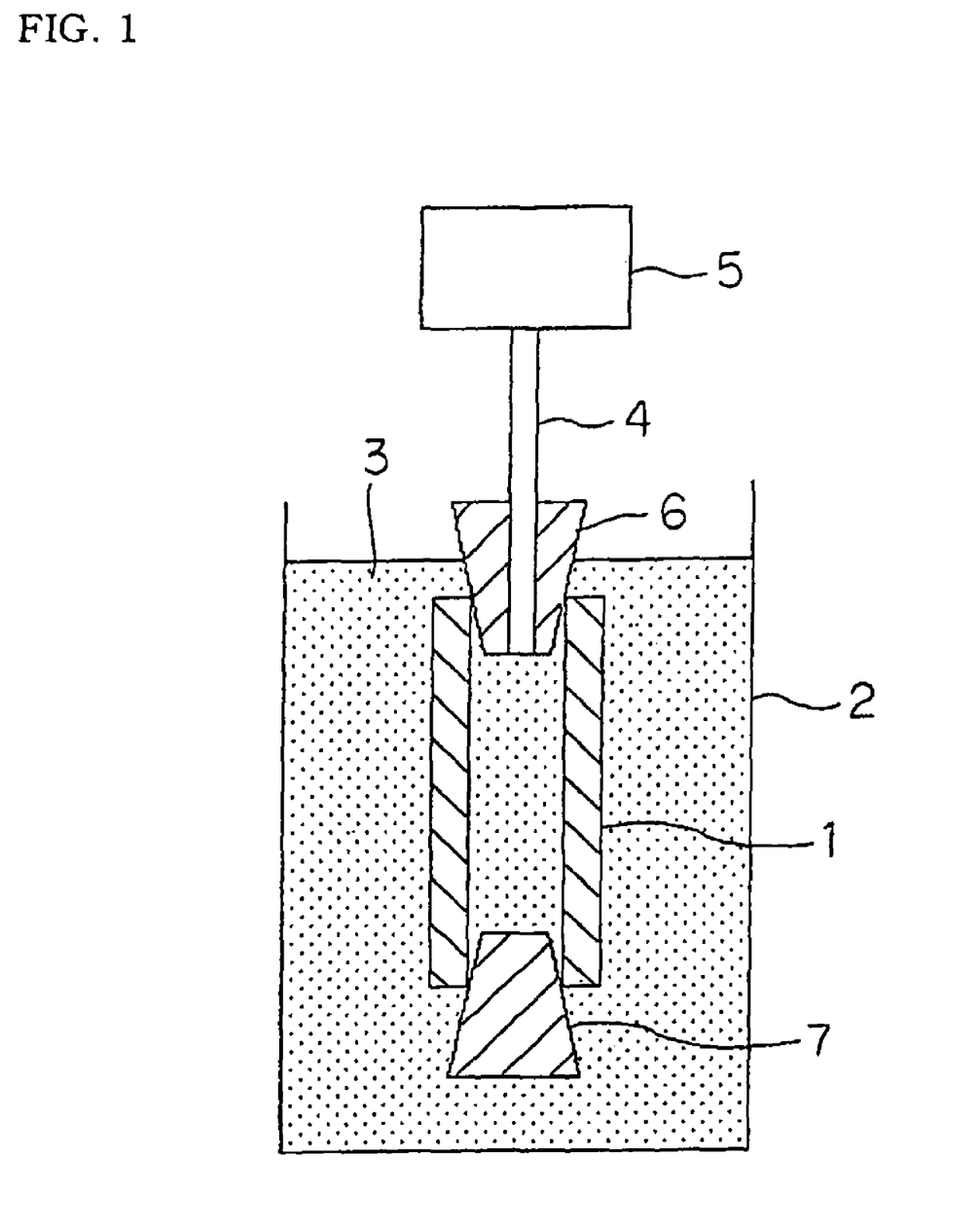
FIG. 1 is a schematic view showing a method for loading a seed crystal-containing layer on a surface of a porous substrate.
Figure 2:
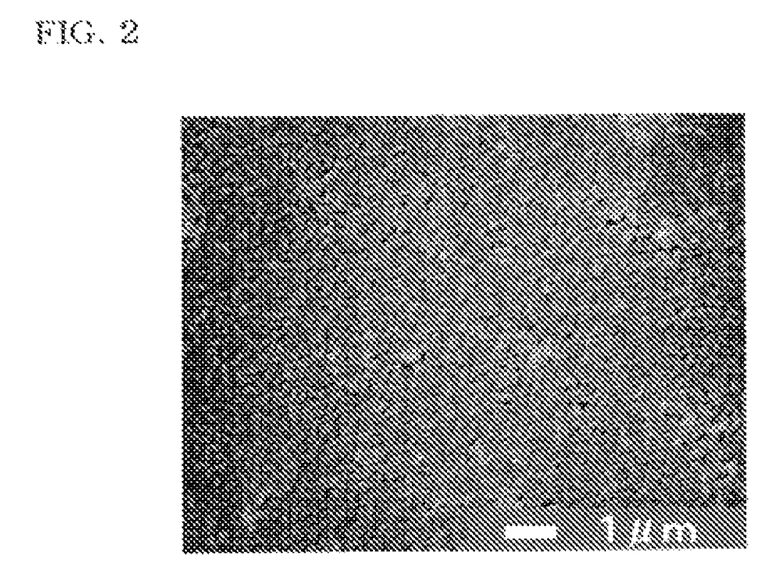
FIG. 2 is an electron microscope photograph of a surface of a porous substrate with a seed crystal-containing layer.
Figure 3:
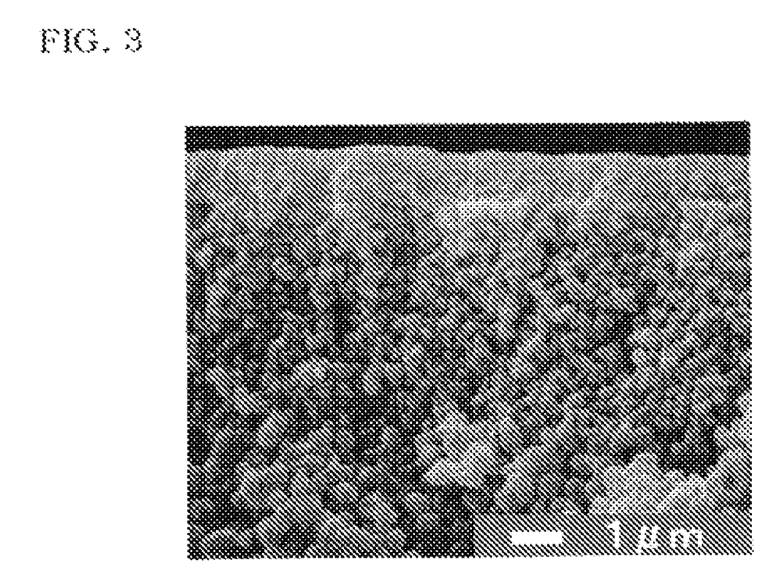
FIG. 3 is an electron microscope photograph of a cross-section of a porous substrate with a seed crystal-containing layer.

As the porous substrate, there was prepared an alumina cylindrical body (outer periphery of 10 mm, length of 1 mm, mean surface pore diameter of 0.1 μm). After the body was washed in water, as shown in FIG. 1, a suction jig comprising a rubber plug 6 through which a pipe 4 is communicated and a vacuum pump 5 connected to the pipe 4 was attached at one end portion of the porous substrate 1, the other end portion was sealed with a rubber plug 7 and immersed in the aforementioned slurry 3 for loading a seed crystal-containing layer with which a container 2 was filled up, and pressure inside the porous substrate 1 was reduced to 0.096 MPa by a vacuum pump 5. The condition was maintained for three seconds for suction filtration of the slurry 3 for loading a seed crystal-containing layer. Thus, a seed crystal-containing layer having a DDR type zeolite powder (seed crystal) and a $TiO_2$ powder was loaded on a surface (outer peripheral face) of the porous substrate 1. Next, the porous substrate 1 was pulled up from the slurry 3 for loading a seed crystal-containing layer and left for a period of time being placed under suction. Then, the suction was cancelled, and the suction jig was detached from the porous substrate 1. After that, the porous substrate having a seed crystal-containing layer loaded thereon was dried in a drying machine at 80° C. and then fired at 800° C. for one hour to unitarily fix the seed crystal-containing layer to the porous substrate to obtain a porous substrate with a seed crystal-containing layer. A surface and a cross-section of the porous substrate with a seed crystal-containing layer were observed with a scanning electron microscope. FIG. 2 shows an electron microscope photograph of a surface of the porous substrate with a seed crystal-containing layer, and FIG. 3 is an electron microscope photograph of a cross-section of the porous substrate with a seed crystal-containing layer.

Formation of Zeolite Membrane

Figure 4:
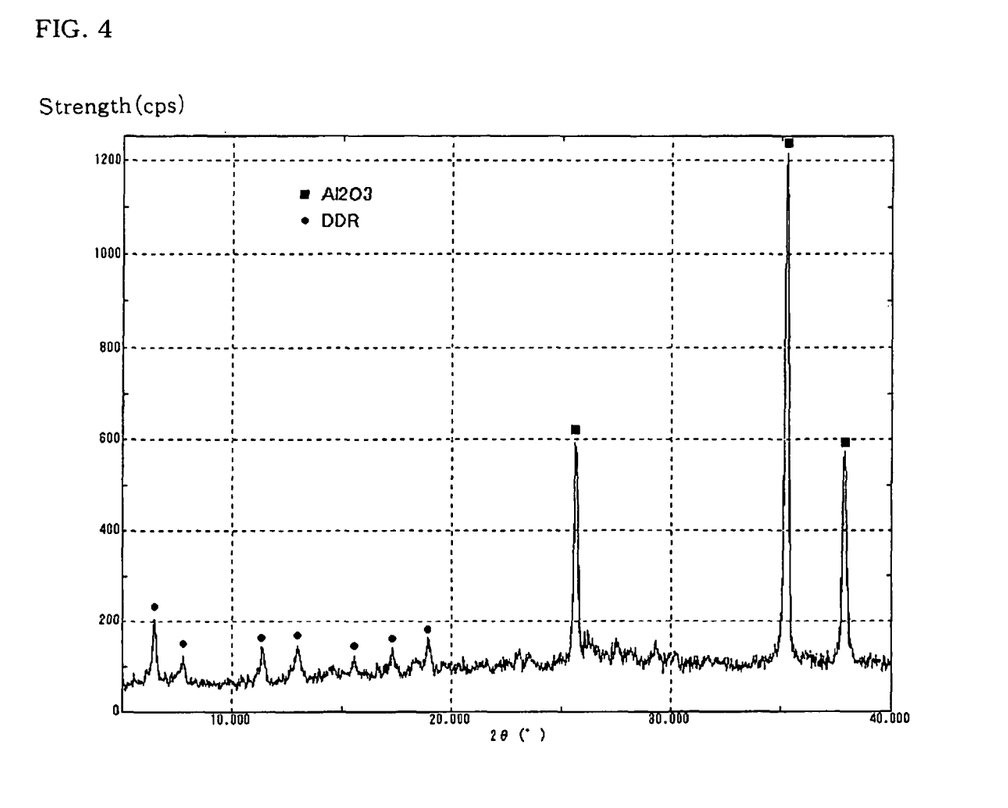
FIG. 4 is a graph showing a result of measuring an X-ray diffraction of a surface of a porous substrate having a zeolite membrane formed thereon.
Figure 5:
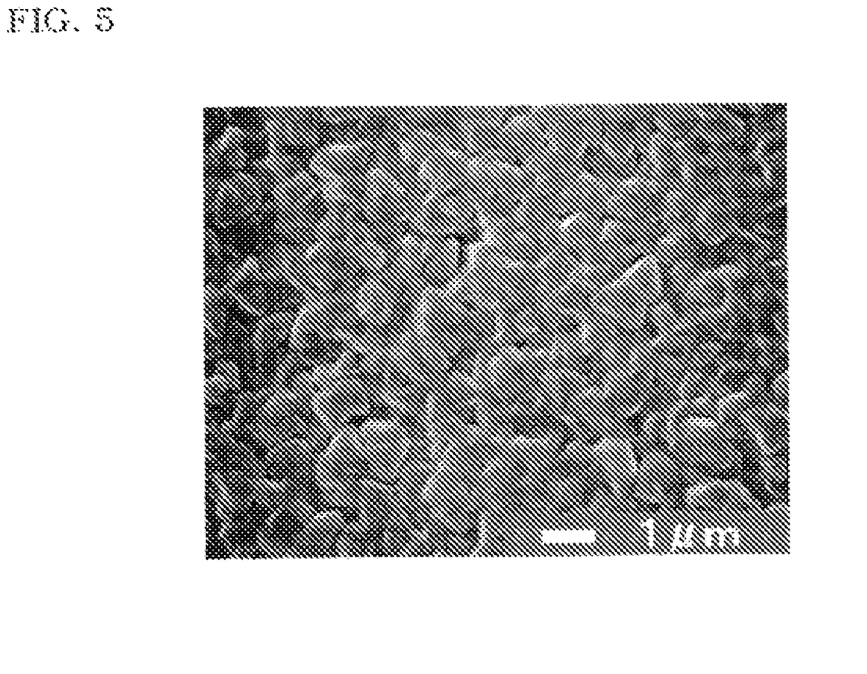
FIG. 5 is an electron microscope photograph of a surface of a porous substrate after a zeolite membrane is formed thereon.
Figure 6:
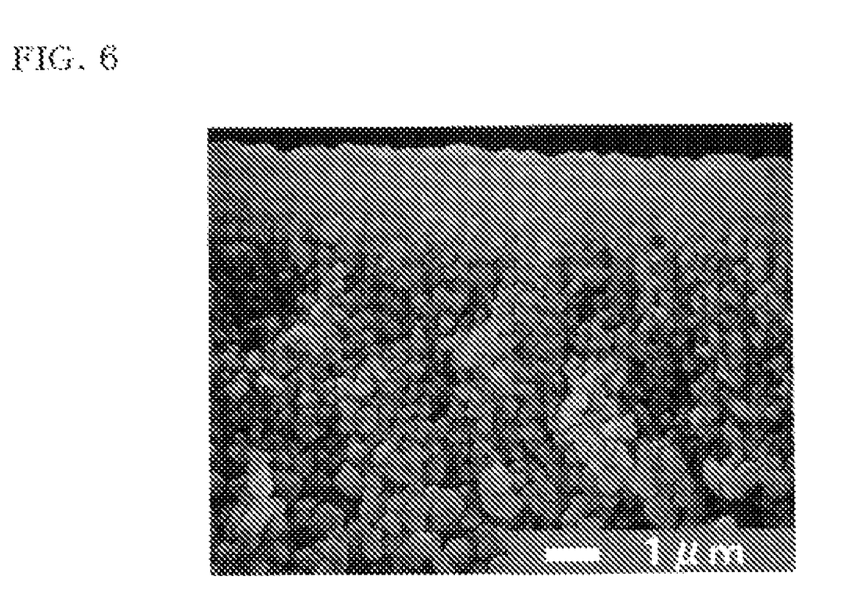
FIG. 6 is an electron microscope photograph of a cross-section in the vicinity of a surface of a porous substrate after a zeolite membrane is formed thereon.

The above porous substrate with the seed crystal-containing layer was put in a stainless tetrafluoroethylene pressure resistant container with an internal cylinder, and a raw material solution for synthesizing a zeolite was poured into the container in such a manner that the substrate was completely immersed in the solution. The raw material solution for synthesizing a zeolite had a composition of $SiO_2$:1-adamantanamine:ethylenediamine:$H_2O$ of 1:0.06:0.5:80 at a molar ratio. The container was sealed in a state that the porous substrate with a seed crystal-containing layer and a raw material solution for synthesizing a zeolite were contained therein and put in an electric furnace for hydrothermal synthesis at 160° C. for ten hours to form a zeolite membrane on a surface of the porous substrate. After the hydrothermal synthesis, the porous substrate was cooled down to room temperature, taken out from the electric furnace, well washed, and dried. Next, the porous substrate was put in the electric furnace again and heated at 650° C. for 12 hours in the atmosphere to burn out and remove 1-adamantanamine and ethylenediamine remaining in the membrane to obtain a zeolite membrane of a DDR type zeolite. A surface of the porous substrate having the zeolite membrane thereon was measured with an X-ray diffractometer to confirm a diffraction pattern of alumina constituting the substrate and a diffraction pattern of a DDR type zeolite as shown in FIG. 4. The diffraction pattern of $TiO_2$ was not confirmed. In addition, by observing a surface of the substrate and a cross-section in the vicinity of the surface after forming membrane with a scanning electron microscope, a zeolite crystal formed on a surface of the substrate was confirmed. FIG. 5 shows an electron microscope photograph of a surface of the porous substrate after forming membrane, and FIG. 6 shows an electron microscope photograph of a cross-section in the vicinity of the surface of the porous substrate after forming membrane.

Gas Permeation Test

Figure 7:
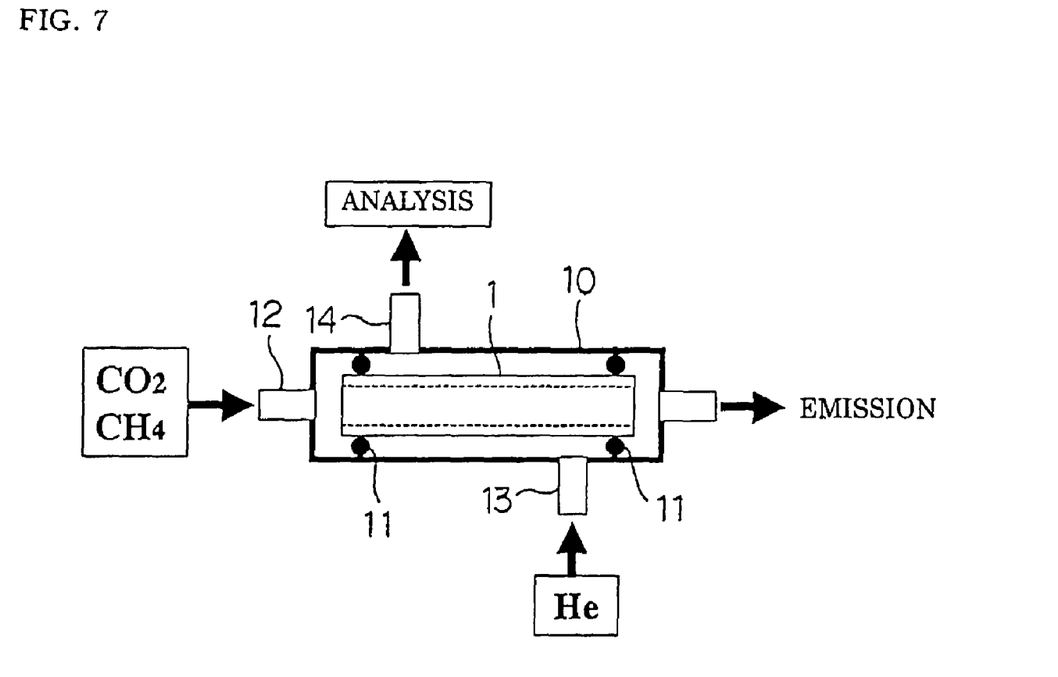
FIG. 7 is a schematic view showing a constitution of a chamber for a gas permeation test used in a gas permeation test.

As shown in FIG. 7, after silicone was thinly applied at both the end portions of a zeolite membrane formed on a surface of the cylindrical porous substrate 1 as described above and hardened, the porous substrate 1 was set in a chamber 10 for a gas permeation test in a state that it was sealed with an O ring 11. Mixed gas prepared by mixing carbon dioxide ($CO_2$) and methane ($CH_4$) at the same molar ratio was introduced into the porous substrate 1 form a mixed gas introduction port 12, and helium gas (He) was allowed to flow outside the porous substrate 1 from a sweep gas introduction port 13. Gas permeated the porous substrate 1 and the zeolite membrane on the surface of the porous substrate 1 was collected from a permeated gas collection port 14, and a composition of the gas was analyzed with a gas chromatography. As a result, it was confirmed that the zeolite membrane functioned as a gas separation membrane because the collected gas contained $CO_2$ being seven times as dense as the $CH_4$.

The present invention can suitably be used in a gas separation membrane, a zeolite membrane used for a permeation-vaporization membrane or the like, a ceramic porous substrate with a seed crystal-containing layer used for manufacturing the membrane, and a method for manufacturing a zeolite membrane.

What is claimed is:

1. A ceramic porous substrate with a seed crystal-containing layer for manufacturing a zeolite membrane comprising:
    a ceramic porous substrate, and
    a seed crystal-containing layer containing a zeolite powder obtained by grinding and a ceramic powder,
    wherein the seed crystal-containing layer containing the powder of zeolite as a seed crystal for forming the zeolite membrane and ceramic powder are loaded on a surface of the ceramic porous substrate, and
    wherein the seed crystal-containing layer is fixed on the ceramic porous substrate by firing the substrate on which the seed crystal-containing layer is loaded to form an outermost surface layer, and
    wherein the seed crystal-containing layer that forms the zeolite membrane defines the outermost surface layer of the ceramic porous substrate.

2. A ceramic porous substrate with a seed crystal-containing layer according to claim 1, wherein the zeolite powder is a DDR (Deca-Dodecasil 3R) type zeolite powder.

3. A ceramic porous substrate with a seed crystal-containing layer according to claim 1, wherein a volume ratio of the zeolite powder to the ceramic powder (volume of the zeolite powder:volume of the ceramic powder) in the seed crystal-containing layer is 80:20 to 10:90.

4. A zeolite membrane formed on a surface of a ceramic porous substrate,
    wherein the zeolite membrane is formed by growing a zeolite powder contained in a seed crystal-containing layer of a ceramic porous substrate with a seed crystal-containing layer by hydrothermal synthesis, and
    wherein the ceramic porous substrate with the seed crystal-containing layer for manufacturing the zeolite membrane comprises a ceramic porous substrate, and a seed crystal-containing layer containing a zeolite powder obtained by grinding and a ceramic powder;
    the seed crystal-containing layer containing the powder of zeolite as a seed crystal for forming the zeolite membrane and ceramic powder being loaded on a surface of the ceramic porous substrate, and the seed crystal-containing layer being fixed on the ceramic porous substrate by firing the substrate on which the seed crystal-containing layer is loaded to form an outermost surface layer, and wherein the seed crystal-containing layer that forms the zeolite membrane defines the outermost surface layer of the ceramic porous substrate.

5. A zeolite membrane according to claim 4, wherein the zeolite powder contained in a seed crystal-containing layer of the ceramic porous substrate is a DDR (Deca-Dodecasil 3R) type zeolite powder.

6. A zeolite membrane according to claim 4, wherein a volume ratio of the zeolite powder to the ceramic powder (a volume of the zeolite powder:a volume of the ceramic powder) in the seed crystal-containing layer is 80:20 to 10:90.

7. A method for manufacturing a zeolite membrane comprising the steps of:

loading a seed crystal-containing layer containing a zeolite powder obtained by grinding as a seed crystal for forming a zeolite membrane and a ceramic powder on a surface of a ceramic porous substrate, firing the seed crystal-containing layer to obtain the ceramic porous substrate with the seed crystal-containing layer fixed thereon, and growing the zeolite powder contained in the seed crystal-containing layer of the substrate by hydrothermal synthesis to form a zeolite membrane on an outermost surface of the ceramic porous substrate, and wherein the seed crystal-containing layer that forms the zeolite membrane defines the outermost surface layer of the ceramic porous substrate.

8. A ceramic porous substrate with a seed crystal-containing layer for manufacturing a zeolite membrane comprising:

a ceramic porous substrate, and a seed crystal-containing layer containing a zeolite powder and a ceramic powder, wherein the seed crystal-containing layer containing a powder of zeolite as a seed crystal for forming the zeolite membrane and ceramic powder are loaded on an outermost surface of the ceramic porous substrate, wherein the seed crystal-containing layer is fixed on the ceramic porous substrate by firing the substrate on which the seed crystal-containing layer is loaded, wherein the seed crystal-containing layer that forms the zeolite membrane defines the outermost surface layer of the ceramic porous substrate, and wherein the zeolite powder is a DDR (Deca-Dodecasil 3R) type zeolite powder with a molar ratio of 1-adamantanamine to silica of 0.002 to 0.03.

* * * * *